(12) United States Patent
Seibel et al.

(10) Patent No.: US 12,554,461 B2
(45) Date of Patent: Feb. 17, 2026

(54) DIGITAL ASSISTANT SERVICE WITH AUTOMATED FUNCTION CALLING

(71) Applicant: SAP SE, Walldorf (DE)

(72) Inventors: Julian Seibel, Hauenstein (DE); Torben Krieger, Dossenheim (DE); Steffen Terheiden, Mannheim (DE); Sebastian Schuetz, Mannheim (DE)

(73) Assignee: SAP SE, Walldorf (DE)

( * ) Notice: Subject to any disclaimer, the term of this patent is extended or adjusted under 35 U.S.C. 154(b) by 135 days.

(21) Appl. No.: 18/538,956

(22) Filed: Dec. 13, 2023

(65) Prior Publication Data

US 2025/0199757 A1  Jun. 19, 2025

(51) Int. Cl.
*G06F 40/40* (2020.01)
*G06F 3/16* (2006.01)

(52) U.S. Cl.
CPC .............. *G06F 3/167* (2013.01); *G06F 40/40* (2020.01)

(58) Field of Classification Search
CPC ................. G06F 3/167; G06F 40/40
USPC ...................... 704/9, 231–232, 251
See application file for complete search history.

(56) References Cited

U.S. PATENT DOCUMENTS

2022/0191208 A1* 6/2022 Stillman ................. G06F 9/547
2025/0005269 A1* 1/2025 Ahmed ................ G06F 40/186

* cited by examiner

*Primary Examiner* — George C Monikang
(74) *Attorney, Agent, or Firm* — SCHWEGMAN LUNDBERG & WOESSNER, P.A.

(57) ABSTRACT

Example systems and methods described herein relate to a digital assistant service with automated function calling. Prompt data is provided to a generative machine learning model. The prompt data includes user input and function data. The user input is received via a user interface associated with a digital assistant. The function data identifies a plurality of functions. A response from the generative machine learning model includes a function identifier associated with a function from among the plurality of functions. In response to detecting that the response includes the function identifier, the function is invoked to obtain output data. The output data is caused to be presented in the user interface associated with the digital assistant.

20 Claims, 10 Drawing Sheets

DIGITAL ASSISTANT SERVICE WITH AUTOMATED FUNCTION CALLING

TECHNICAL FIELD

The subject matter disclosed herein generally relates to digital assistants. More specifically, but not exclusively, the subject matter relates to systems and methods that provide a digital assistant service with automated function calling.

BACKGROUND

Various digital assistants, such as chatbots and other conversational agents, have been developed over the years. Digital assistants commonly rely on explicit conversation design. For example, a developer provides text samples of user input (e.g., an input message typed or spoken by a user) that should invoke a specific action. These are typically referred to as "intents." The developer may further provide samples of real-world objects, which may be referred to as "entities," that have to be modeled explicitly to be usable within a conversation flow.

While digital assistants can be useful tools, several technical problems have been identified. A digital assistant that was modeled in the abovementioned manner may have a limited ability to handle user inputs that were not included in any training data associated with defined intents or entities. For example, where user input goes beyond a simple reformulation of training data, the digital assistant may be unable to map the user input to an intended action. Moreover, conversations can typically only be handled according to a predetermined flow. For example, the digital assistant may be unable to unify separately provided user inputs or integrate contextual data items across messages. This can make it difficult to perform slot-filling or handle co-referencing when the conversation deviates from the predetermined flow. These technical issues may lead to suboptimal system performance or efficiency, limited functionality, or poor user experience.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
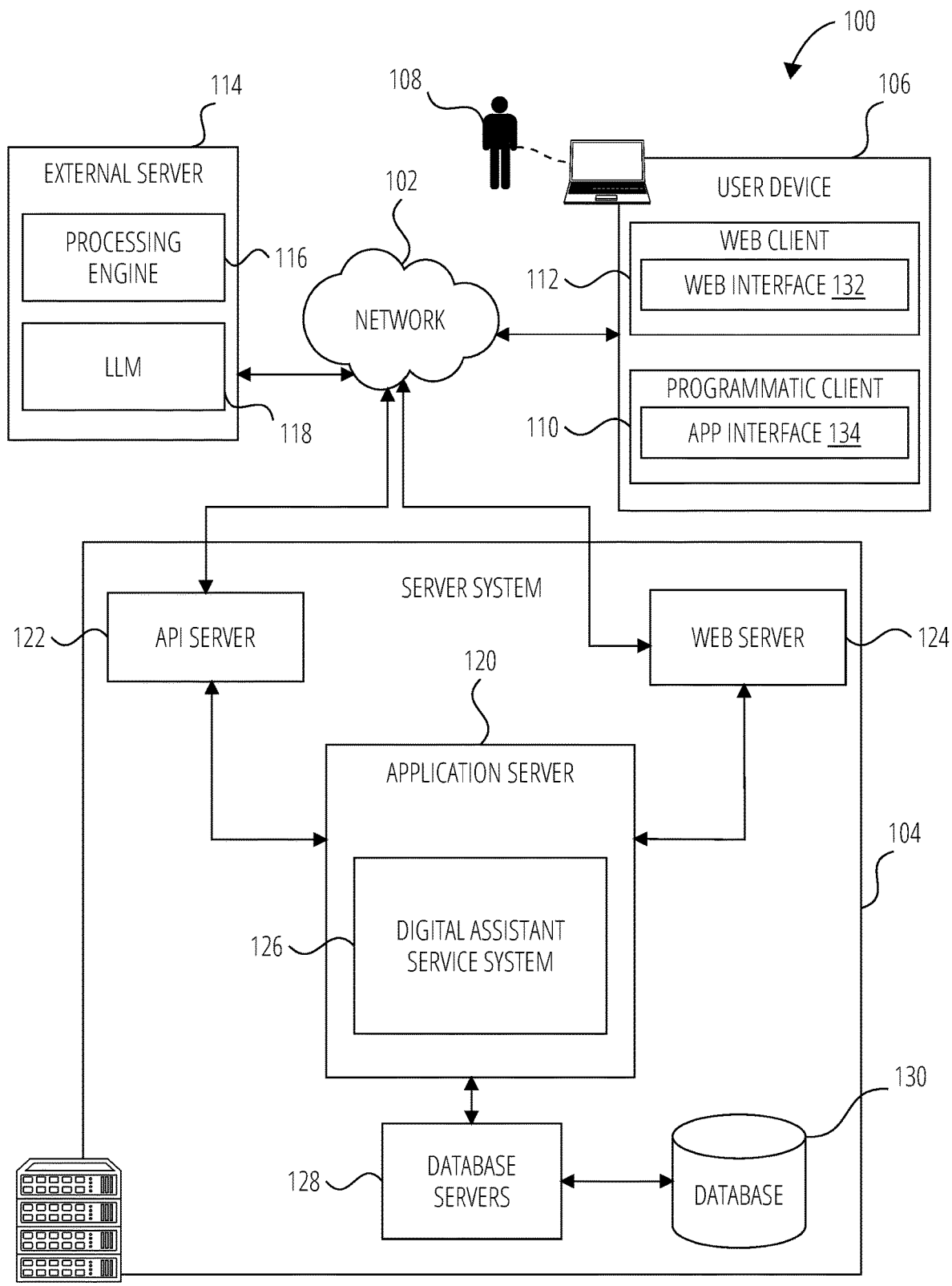
FIG. 1 is a diagrammatic representation of a network environment that includes a digital assistant service system, according to some examples.

Examples described herein relate to a context-aware digital assistant that leverages generative artificial intelligence (AI). The term "digital assistant," as used herein, refers to a software agent, application, or software-driven system that can interpret user input (e.g., user requests or user messages), execute or trigger associated actions, and provide relevant information back to the user, including through natural language conversations. Examples of digital assistants include chatbots, conversational agents, and voice assistants. While non-limiting examples described herein focus on text inputs and text outputs provided in a user interface (e.g., on a display of a user device), it is noted that a digital assistant may interact with a user via various modalities, such as text, speech, touch, or combinations thereof.

In some examples, a digital assistant leverages a large language model (LLM) as a central orchestrator for conversation and context. This may reduce or even obviate the need for manual or explicit definitions of conversation flows (e.g., there may be no need to define intents, entities, or slot-filling protocols). Instead, when a user inputs a query, a prompt is automatically generated that provides a role definition (e.g., defines the "personality" of the digital assistant), a list of available functions, explanations of those functions, and conversation history data. The LLM may then process the prompt to generate a response.

In some examples, the response either represents a function call or provides a direct response to the query (e.g., a direct response that requests more information, provides general information that is not related to a function, or is intended as "small talk"). The term "function," as used herein in the context of a digital assistant, refers to a capability that is accessible to, or can be leveraged by, the digital assistant, either directly or indirectly. For example, the digital assistant may be enabled to invoke or cause invocation of a function by generating a function identifier and one or more parameter values (e.g., arguments) for one or more parameters of the function. Functions can range from relatively simple information retrieval operations, such as retrieving weather data or an invoice, to more complex or multi-step operations, such as creating and authorizing a purchase order or causing a financial transaction to occur. A function may define behavior that has a particular business focus or outcome. In some examples, execution of the function involves a call to a backend service (e.g., calling the function get_purchase_orders to query purchase orders from a backend service).

A method may include providing prompt data to a generative machine learning model (e.g., an LLM) to obtain a response. The prompt data may include user input and function data. The user input is, for example, a user message in natural language format. The user input may be received via a user interface associated with a digital assistant. The digital assistant may, for example, be provided by a digital assistant service via a web client at a user device.

In some examples, the function data identifies a plurality of functions and, where a function has one or more parameters, the one or more parameters of each function. In some cases, one or more of the functions do not have parameters. The method may include detecting that the response includes a function identifier. The function identifier may be associated with a function from among the plurality of functions.

The term "function identifier," as used herein, refers to an identifier or mechanism used to denote that a function should be executed or invoked. For example, the function identifier may be a uniquely identifiable function name included in the response of the generative machine learning model. Alternatively or additionally, the function identifier may be a schema, format, or structure of the response (e.g., a predefined structured format that identifies the response as being intended to invoke a function). The function identifier may comprise a combination of elements, such as a function name expressed in a predefined format that accords with a given schema for function calling.

In some examples, such as when the function identifier is a function name, the function identifier indicates which function should be executed. In other examples, the response may include both the function identifier and an additional element that indicates which function should be executed.

It may be desirable, in some examples, to have all responses generated using the same structured format, with the function identifier being located within the structured format. For example, a response category type may be a key within a JavaScript Object Notation (JSON) structure and the value of that key indicates whether the response invokes a function.

In response to detecting that a function should be invoked (e.g., based on detecting that the response includes the function identifier), a system as described herein may invoke the function to obtain output data. For example, the response includes a parameter value for each of the one or more parameters of the function, and the parameter values are used to invoke the function. In some cases, the response does not include a parameter value, and the system invokes the function using the function identifier directly.

In some examples, parameter values for a first function may be fetched using a second function. Accordingly, in some cases, a digital assistant is enabled to obtain at least a subset of parameter values without explicit user input identifying those parameter values.

The prompt data may include one or more of the following types of data: a role definition for the digital assistant, a set of functions (e.g., a dynamic set of functions that is retrieved in real time), and conversation history data associated with a current user. The prompt data may indicate a structured format in which to provide the response if the response is intended to trigger a function. For example, the prompt data may include a schema for function calling. The prompt data may also contain a description of the concept of function calling. In some examples, the function data comprises, for each of the plurality of functions, a natural language description of one or more characteristics of the function. For example, for each function, a brief description of "what the function does," in practical terms, may be included.

Based on the prompt data, the generative machine learning model may generate different types or categories of output, such as a function call or a direct response. A function call may include parameter values for the one or more parameters of the relevant function. A direct response may be a response that is directly passed to the user, such as a request to the user to provide additional values for a function call, conversational user experience outputs, "small talk," information about the capabilities of the digital assistant, or information about a reason a previous response was given. Thus, in some examples, the direct response comprises a request for additional user input related to the function, or a non-function-related response (e.g., a response with a conversational focus).

In some cases, the method may include obtaining multiple responses from the generative machine learning model. For example, a first response is received and it is detected that the first response does not include the function identifier. In response to detecting that the first response does not include the function identifier, the first response may be recognized or designated as a direct response and presented directly as output data in the user interface associated with the digital assistant. A second response may then be received, which is recognized as a function call, causing invocation of the relevant function. Output data generated based on output of the function may then be presented in the user interface.

As alluded to above, a system as described herein may detect a response type based at least partially on its format. For example, a direct response may be provided by the generative machine learning model in an unstructured format, while a function call is provided by the generative machine learning model in a structured format or in accordance with a specific schema. For example, if a response is provided in JSON format, it may be recognized as a function call or candidate function call, while if the response is free-form text, the response is designated as a direct response that is passed on to the user.

The method may include parsing the response to determine whether the response is a direct response or a function call. For example, the response is identified as being a function call based on the detection of the function identifier. In some examples, the function call is an Application Programming Interface (API) call. Execution of the function call may include selecting an API endpoint associated with the function from among a plurality of API endpoints associated with the function data, generating the API call to include the parameter value for each of the one or more parameters of the function, transmitting the API call to the API endpoint, and receiving output data from the API endpoint.

For example, the API call may be a call to an enterprise resource planning system that is communicatively coupled to a digital assistant service system to create a sales order or some other business artifact. The output data may then include details of the created business artifact. In another example, the API call may be a call to a billing system to retrieve invoice details associated with certain criteria. The output data may then be the invoice details.

In some examples, the system identifies a restricted action associated with the function. The restricted action may include completing execution of the function. For example, the system may detect that the function may only be completed upon explicit user approval. In another example, the system may detect that certain information may only be presented to a user if the user enters the correct password.

In response to identifying the restricted action, a user-selectable element may be presented in the user interface together with the parameter value for at least one of the one or more parameters of the function. For example, the user-selectable element may be an approval element in a graphical user interface that the user is requested to select in order to confirm the action. The method may include receiving a user selection of the user-selectable element, and in response to receiving the user selection of the user-selectable element, performing the restricted action associated with the function.

As indicated, the user input may include a user message provided by a user of the digital assistant, with the output data being generated to respond to the user message. In some examples, the prompt data provided to the generative machine learning model includes conversation history data that includes one or more earlier user messages provided by the user and earlier output data generated to respond to the one or more earlier user messages.

The conversation history data may be provided in a structured format and the prompt data may provide an indication of the structured format. The conversation history data may reflect the course of a conversation by, for example, persisting the conversation in a chronologically ordered list. For example, the list may be ordered as follows for each exchange of information: (i) user input, (ii) function call (where relevant), and (iii) output data (e.g., direct response or output based on function execution result).

In some examples, the conversation history data is continuously updated to include the latest user input and corresponding output data (and function calls, where relevant), such that, when a user submits a follow-up user message, the generative machine learning model is provided with conversation history data that includes the latest information. For example, if a user first mentions "I'm traveling to Paris next week," and then later mentions "What's the weather like there?" the generative machine learning model is enabled to identify that "there" refers to "Paris." In other words, examples described herein address the natural language processing problem referred to as "co-reference resolution."

The functions described herein may be referred to as "dialog functions," because, at least in some examples, they are designed or supported in the context of a conversational dialog between a user and a digital assistant. In some examples, a dialog function is invoked based on natural language, unstructured, or conversational input from a user. In other words, the user merely has to provide input indicating "what the user wants to do," without having to correctly structure an input. The digital assistant may thus have natural dialog exchanges with the user while allowing the user to accomplish useful tasks, as opposed to simply executing logic in response to commands that conform to a schema.

The use of a generative machine learning model, such as an LLM, allows a developer to provide significantly less input (e.g., merely a "skeleton" describing each function's parameters and what it does), with the generative machine learning model dynamically populating the relevant data by extracting details from user input and conversation context. This may enable a developer to shift focus from "how to call a function" to "what can the function do" in the context of digital assistant design.

Examples described herein provide technical benefits when compared to digital assistants that require manual, explicit definition of intents, entities, slots, and conversation flows (e.g., dialog nodes and dialog trees), such as reducing input data requirements while providing more natural and diverse outputs. Relying on manually defined intents, entities, and rigid conversation flows requires extensive human effort to craft. This makes it challenging to handle variations in user input that go beyond predefined samples.

Conventional digital assistants may be constrained to hardcoded conversation flows and slot-filling logic explicitly authored by developers. This limits their ability to support natural, context-aware conversations that leverage information provided earlier in the dialog. By leveraging a generative machine learning model to dynamically interpret user input without needing manually defined intents and entities, these technical problems can be addressed or alleviated, enabling handling of a wider range of conversational variations.

When compared to a digital assistant that relies solely on a LLM (e.g., that sends user input to an LLM and returns all output directly to the user), examples described herein provide various technical benefits, such as the ability to explicitly define functions (e.g., business-critical functions) and ensure reliable responses with respect to those functions, while still leveraging the powerful and "creative" nature of an LLM. For example, a user can obtain benefits of generative AI through direct responses, while business-critical functions are still deterministically performed through the invocation of functions as described herein. This may allow an organization to have a greater level of control over business-critical functions.

Examples described herein maintain conversation context across interactions and enable a digital assistant to dynamically leverage this context. This provides greater flexibility to have free-flowing, context-aware conversations. The addition of modular dialog functions with published interfaces may enable easier integration of new capabilities without disrupting existing flows. For example, the functions supported by a digital assistant may be dynamically adjusted without significantly impacting availability or performance. In contrast, in a conventional digital assistant, there may be a tight coupling between conversational flows and capabilities, making it significantly more difficult to add or change functionality (e.g., to update a chatbot to add new capabilities without significant downtime).

When the effects in this disclosure are considered in aggregate, one or more of the methodologies described herein may thus obviate a need for certain efforts or resources that otherwise would be involved in developing or deploying digital assistants. Computing resources utilized by systems, devices, databases, or networks may be more efficiently utilized or reduced, e.g., as a result of a reduced or obviated requirement to design, input, and process conversation flows, intents, entities, dialog trees, or the like, or as a result of improved availability due to the use of modular dialog functions. Examples of such computing resources may include processor cycles, network traffic, memory usage, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 112 (e.g., a browser) or a programmatic client 110 (e.g., an "app") may be hosted and executed on the user device 106.

An API server 122 and a web server 124 provide respective programmatic and web interfaces to components of the server system 104. A specific application server 120 hosts a digital assistant service system 126, which includes components, modules, or applications. It will be appreciated that the digital assistant service system 126 may be hosted across multiple application servers in other examples.

The user device 106 can communicate with the application server 120. For example, the user device 106 can communicate with the application server 120 via the web interface supported by the web server 124 or via the programmatic interface provided by the API server 122. It will be appreciated that, although only a single user device 106 is shown in FIG. 1, a plurality of user devices may be communicatively coupled to the server system 104 in some examples. For example, multiple users may access the digital assistant service system 126 using respective user devices to utilize its functionality. Further, while certain functions may be described herein as being performed at either the user device 106 (e.g., web client 112 or programmatic client 110) or the server system 104, the location of certain functionality either within the user device 106 or the server system 104 may be a design choice.

The application server 120 is communicatively coupled to database servers 128, facilitating access to one or more information storage repository, e.g., a database 130. In some examples, the database 130 includes storage devices that store information to be processed by the digital assistant service system 126 or other components shown in FIG. 1. For example, the database 130 may store function data associated with functions supported by a digital assistant. The function data may be updated periodically such that the digital assistant supports a dynamic set of functions. Where the digital assistant service system 126 deploys multiple different digital assistants, each digital assistant may support a different subset of functions.

The application server 120 accesses application data (e.g., application data stored by the database servers 128) to provide one or more applications or software tools to the user device 106 via a web interface 132 or an app interface 134. In particular, the user 108 is enabled to access a digital assistant provided by the digital assistant service system 126 via the user device 106.

The digital assistant service system 126 functions to handle user interactions and fulfillment of capabilities for the digital assistant. The digital assistant service system 126 includes various components to interpret user input, determine and invoke appropriate functions, generate responses, and integrate with external systems.

In some examples, the digital assistant service system 126 enables natural language conversations by receiving user input, analyzing input to determine appropriate responses, calling functions to execute capabilities, and generating conversational responses. The digital assistant service system 126 maintains context to enable dialogs spanning multiple exchanges. As described in greater detail elsewhere, the digital assistant service system 126 may provide a modular architecture that integrates external systems and functions (e.g., via standardized interfaces).

The digital assistant service system 126 can integrate or communicate with a variety of platforms and endpoints. For example, the user 108 may access the digital assistant provided by the digital assistant service system 126 via the web client 112 or the programmatic client 110, and interact with the digital assistant via the web interface 132 or the app interface 134.

In some examples, the user 108 uses the web interface 132 of the web client 112 of the user device 106 to access the environment provided by the digital assistant service system 126. For example, the web client 112 may transmit instructions to and receive responses from the server system 104 to allow it to update a user interface, creating a dynamic and interactive web application experience. In some examples, the digital assistant is provided as a support tool that is presented as a window in association with a primary application. The digital assistant service system 126 may add an AI-powered, conversational experience "on top of" a standard user interface provided by the web client 112 and web interface 132 at the user device 106.

In other examples, at least parts of the digital assistant may run on the web client 112 and its user interface can be updated, at least in some cases, without transmitting instructions to and receiving response from the server system 104. Accordingly, while the digital assistant service system 126 is shown as residing within the server system 104 in FIG. 1, it will be appreciated that functionality or features of the digital assistant service system 126 may be provided so as to run at least partially at the user device 106.

In some examples, the digital assistant service system 126 provides AI-assisted or AI-driven digital assistant services that include natural language interactions and interpretation. The digital assistant service system 126 may receive user queries, generate and provide prompts to a machine learning model to obtain responses to user queries, and present responses to the user 108. Accordingly, the digital assistant service system 126 may allow the user 108 to ask natural language questions or submit natural language requests, related, for example, to an application that the user 108 is working with or to a business function that the user 108 would like to perform.

The machine learning model may be hosted on an external server 114 that provides a processing engine 116 and a trained model, such as an LLM 118 (as an example of a generative machine learning model), as shown in FIG. 1. However, in other examples, the machine learning model may be internally hosted.

In some examples, the application server 120 is part of a cloud-based platform provided by a software provider that allows the user 108 to utilize the features of the digital assistant service system 126. One or more of the application server 120, the database servers 128, the API server 122, the web server 124, and the digital assistant service system 126, or parts thereof, may each be implemented in a computer system, in whole or in part, as described below with respect to FIG. 10.

In some examples, external applications (which may be third-party applications), such as applications executing on the external server 114, can communicate with the application server 120 via the programmatic interface provided by the API server 122. For example, a third-party application may support one or more features or functions on a website or platform hosted by a third party, or may perform certain methodologies and provide input or output information to the application server 120 for further processing or publication.

Referring more specifically now to the external server 114, the external server 114 houses the LLM 118 and related processing capabilities. The external server 114 may provide an external, scalable server environment dedicated to running and serving queries to the LLM 118.

The LLM 118 may be a computational model developed for the tasks of processing, generating, and understanding human language. It employs machine learning methodologies, including deep learning architectures. The training of the LLM 118 may utilize comprehensive data sets, such as vast data sets of textual content, to enable the LLM 118 to recognize patterns in human language. The LLM 118 may be built upon a neural network framework, such as the transformer architecture. The LLM 118 may contain a significant number of parameters (e.g., in excess of a billion), which are adjusted during training to optimize performance. Machine learning techniques are described in greater detail with reference to FIG. 8.

The processing engine 116 may be a component running on the external server 114 that is communicatively coupled to the LLM 118. The processing engine 116 may handle certain preprocessing of data before sending it to the LLM 118 and certain postprocessing of the responses received from the LLM 118. For preprocessing, the processing engine 116 may tokenize, compress, or format the data to optimize it for the LLM 118. For postprocessing, it may format the LLM 118 response, perform detokenization or decompression, and prepare the response for sending back to the requesting system (e.g., the digital assistant service system 126).

The LLM 118 may provide natural language processing capabilities that can assist with user queries, understanding context or instructions, identifying functions of interest, identifying further information required to perform functions, invoking function calls, and generating natural language responses. In some examples, the LLM 118 has been fine-tuned on relevant tasks and conversations to enhance its ability to provide useful troubleshooting insights and solutions. For example, the LLM 118 may be fine-tuned to focus specifically on queries relating to functions (e.g., "dialog functions") and to provide function call responses in a particular format (e.g., JSON format). The digital assistant service system 126 may thus integrate with the LLM 118 to add a human-like, conversational interface for users interacting with a digital assistant.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
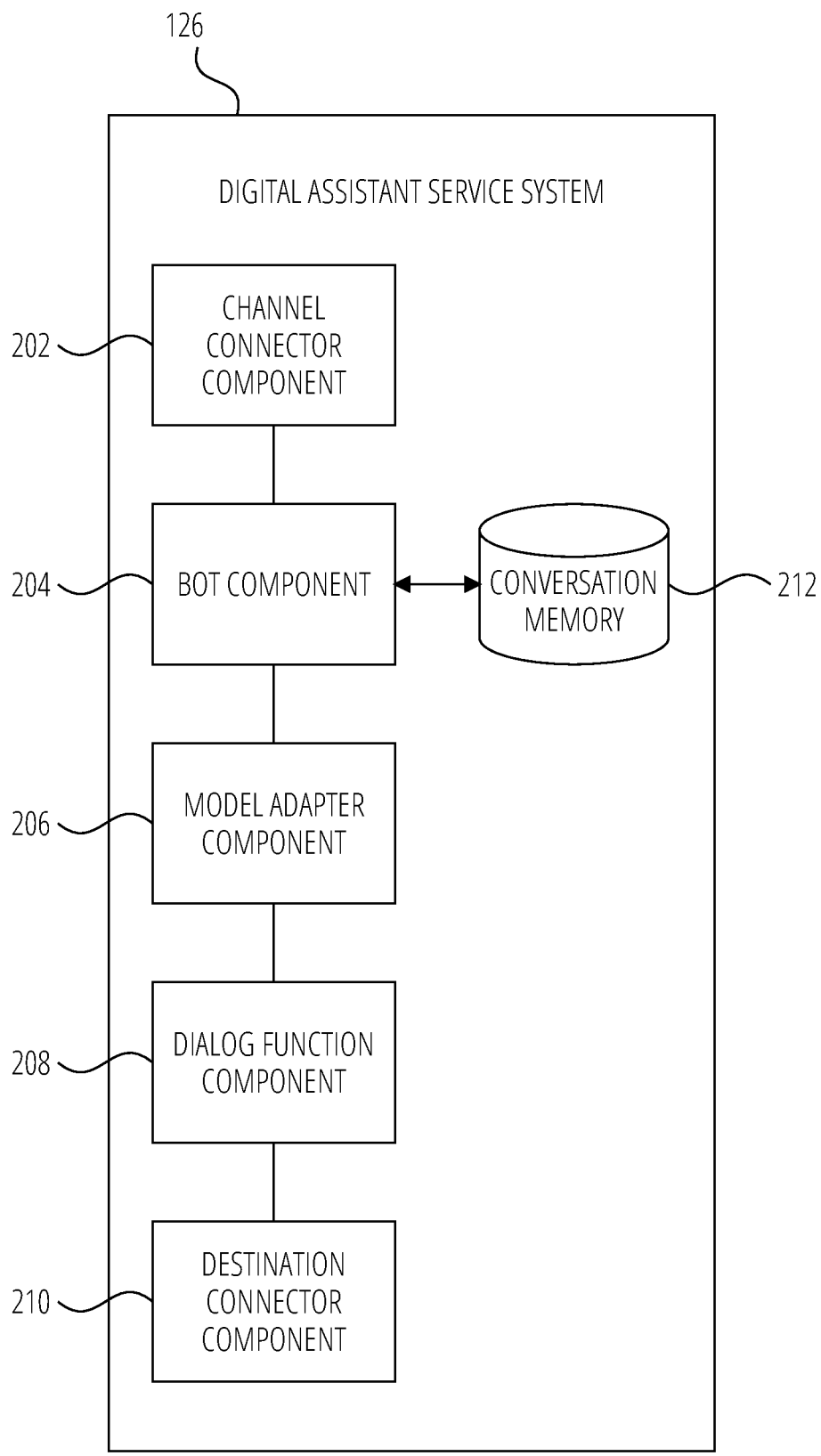
FIG. 2 is a block diagram of certain components of a digital assistant service system, according to some examples.

FIG. 2 is a block diagram illustrating certain components of the digital assistant service system 126 of FIG. 1, according to some examples. The digital assistant service system 126 is shown to include a channel connector component 202, a bot component 204, a model adapter component 206, a dialog function component 208, a destination connector component 210, and a conversation memory 212.

The channel connector component 202 serves as an interface to external user systems and devices accessing the digital assistant. The channel connector component 202 is configured to handle or translate various protocols and data formats to normalize communications between user devices and the digital assistant service system 126. This enables support for devices accessing the digital assistant via different channels (as is further described with reference to FIG. 3). The digital assistant may be configured to support multiple message types in addition to plain text (e.g., messages including images) or handle voice inputs. The channel connector component 202 provides front-end integration functionality allowing, for example, the user 108 to open an application in the web client 112 and interact with the digital assistant via a chat window.

The bot component 204 is responsible for receiving user input to the digital assistant from the channel connector component 202. In cases where the digital assistant service system 126 provides access to multiple different digital assistants, the bot component 204 may direct user input to the correct digital assistant. The bot component 204 also manages conversation history data by repeatedly accessing and updating the conversation memory 212. In some examples, upon receiving a new user message, the bot component 204 transmits the new user message together with the latest set of conversation history data (if any) to the model adapter component 206.

In some examples, the conversation memory 212 stores not only the history of a current session between the user 108 and the digital assistant, but also the conversation history data of one or more previous sessions between the user 108 and the digital assistant, thereby enhancing the ability of the digital assistant to, for example, resolve co-references. In other words, when a prompt is generated, it may include details of earlier conversations between the user and the digital assistant. The conversation history data may be stored as context, for example, in a context window of the generative machine learning model. The context may be dynamically updated, for example, to ensure that the conversation history data does not take up more than a threshold portion of the context window. For example, the bot component 204 may automatically delete older parts of the conversation history data, or automatically summarize the conversation history data to reduce its overall token size.

The bot component 204 may be responsible for efficiently managing the conversation memory 212 with respect to a particular session or conversation. Examples described herein may reduce memory requirements given that fewer variables may need to be explicitly defined and stored (e.g., intents, entities, structured flows, and explicit conversation state information). In some examples, the conversation memory 212 can be fully handled by storing only strings of user input and digital assistant outputs.

The model adapter component 206 serves as an adapter layer between a bot runtime and a generative machine learning model. The model adapter component 206 is responsible for generating prompt data to provide to the generative machine learning model (e.g., the LLM 118, which is referred to below as a non-limiting example). For example, the model adapter component 206 takes the user message and conversation history data received from the bot component 204 and adds additional context data to generate the prompt data. The model adapter component 206 may add function data that identifies a set of functions available to the digital assistant and describes their characteristics (e.g., what they do) and parameters (e.g., the arguments needed to call the function), as well as a role definition. In some examples, a function does not have any parameters (e.g., the function data identifies only the function and its characteristics). Various types of additional contextual information can be provided to the generative machine learning model to guide it with respect to its task or certain output requirements, such as a desired level of detail, format, and style.

The generative machine learning model is responsible for natural language processing, conversation generation, function resolution, and slot filling (where required to complete a function call, for example). The model adapter component 206 may parse the response received from the generative machine learning model to determine a response type. For example, the model adapter component 206 may determine whether the response is a function call or a direct response. If the response is a direct response, the model adapter component 206 may return the response directly to the bot component 204 to cause the response to be presented at a user device. If the response is a function call, the function call is transmitted to the dialog function component 208. The model adapter component 206 may detect that the response is a function call based on a structure or schema of the response, or some other function identifier, as described elsewhere herein.

The model adapter component 206 may handle integration with API endpoints, such as one or more API endpoints of the LLM 118 (e.g., by communicating with the processing engine 116 of the external server 114). The prompt data may be transmitted to the LLM 118 as a single prompt. Alternatively, different portions of the prompt data may be provided separately. For example, the function data or other context data, such as a role definition, may be provided as a "pre-prompt" portion of the prompt data, given that such data would be included in the context window of the LLM 118 for each user input. Other data, such as the user input or conversation history data, may then be provided separately.

In some examples, the model adapter component 206 is responsible for preprocessing the user message. For example, the model adapter component 206 may adjust the format of the user query or modify certain data items in the user query. In some cases, the model adapter component 206 may detect that the user query includes personally identifiable information (PII) and perform de-identification on the relevant data items before sending the prompt data to the LLM 118 (the model adapter component 206 may then re-identify the response from the generative machine learning model to the extent required after receiving the response). In some cases, the model adapter component 206 may automatically transform the user message, or parts thereof, to reduce its overall size (e.g., perform token minimization to reduce token size).

The dialog function component 208 operates to initiate or complete actions associated with functions supported by the digital assistant. The dialog function component 208 receives function calls (e.g., an identifier of the function and its arguments) and then determines which function to invoke. The dialog function component 208 may transmit instructions to the destination connector component 210 to retrieve information from one or more destinations or to call one or more endpoints to perform actions. The dialog function component 208 may also receive outputs from one or more destinations and generate final output data to present in the user interface. In some examples, the dialog function component 208 is responsible for generating all output messages that involve business-critical functions (e.g., functions supported by the digital assistant), while other responses (e.g., non-function related conversational responses) are not generated by the dialog function component 208, as the response from the LLM 118 is used directly in such instances.

A response generated by the dialog function component 208 using, for example, an API response, can have a predefined pattern or format. For example, the LLM 118 may provide a function call for a get_current_weather function which results in retrieval of a temperature and weather description for a particular city (included in the function arguments). The dialog function component 208 may then generate output data according to a predetermined pattern, such as "The temperature in [CITY] at the moment is [TEMPERATURE], and the weather is generally [DESCRIPTION]."

The destination connector component 210 connects the digital assistant service system 126 to one or more backend services, such as functional modules of a business or data sources. For example, the destination connector component 210 may connect the digital assistant service system 126 to multiple business modules, such as an enterprise resource planning system, a human resources system, an account system, or a customer relationship management system. The destination connector component 210 may provide integration points to enable function calling directed at a selected destination. The dialog function component 208 or the destination connector component 210 may be responsible for selecting, for example, the correct API endpoint to call for a particular function included in a response from the LLM 118.

In some examples, at least some of the components shown in FIG. 1 or FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 3:
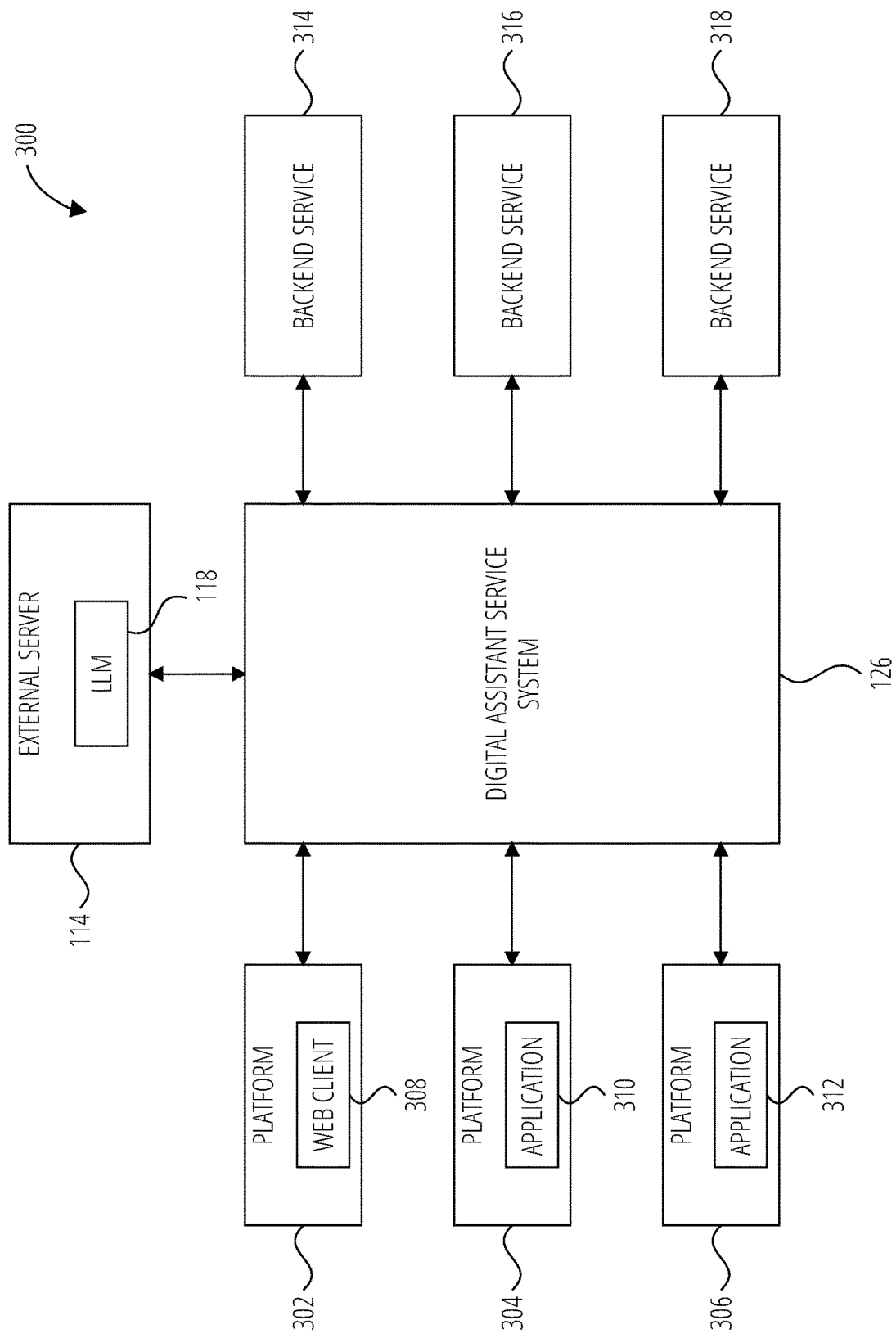
FIG. 3 diagrammatically illustrates interaction of a digital assistant service system with a plurality of platforms, an external server, and a plurality of backend services, according to some examples.

The diagram 300 of FIG. 3 diagrammatically illustrates interaction of the digital assistant service system 126 of FIG. 1 with a plurality of platforms 302, 304, 306, with the external server 114 of FIG. 1, and with a plurality of backend services 314, 316, 318, according to some examples. The platforms 302-306 shown in FIG. 3 represent different client environments from which users may interact with a digital assistant. For example, users may access the digital assistant provided by the digital assistant service system 126 using a web client 308 associated with the platform 302, using an application 310 associated with the platform 304, or using an application 312 associated with the platform 306.

The channel connector component 202 of FIG. 2 is configured to enable the digital assistant service system 126 to integrate with the different platforms 302-306. For example, the platform 302 may be a human resources management tool that has the digital assistant integrated into its web client 308, while the platform 304 is a data analytics platform that has the digital assistant integrated into its application 310, and the platform 306 is a cloud analytics ecosystem that provides a conversational AI experience through the application 312.

The digital assistant service system 126 receives user input from users accessing the platforms 302-306 and transmits responses to their respective user devices via the platforms 302-306. The digital assistant service system 126 also, in some examples, communicates with the LLM 118 hosted by the external server 114 to obtain AI-generated responses. In other examples, the digital assistant service system 126 may have an internal generative machine learning model that it uses to generate responses.

In some cases, a response generated by the LLM 118 is a direct response which is directly passed on to a user device of a user. A direct response refers, for example, to conversational content generated by the digital assistant and provided directly back to the user device of the user (e.g., the user device 106 of the user 108), without invoking execution of a function. Direct responses may include clarification questions (e.g., "I need more information from you to generate your purchase order . . . "), notifications (e.g., "Your purchase order will be created."), "small talk" responses (e.g., "I am well, thank you for asking. How can I help you?"), or other dialog generated based on the conversational context. Unlike function calls, direct responses do not trigger operations or retrieval of new information from external services (e.g., one of the backend services 314-318, as described below).

In other cases, the response represents a function call. The digital assistant may cause invocation of a specified function when the LLM 118 passes, for example, a function name and arguments to the model adapter component 206. This results in execution of the encapsulated capability, such as retrieval of data or performance of operations associated with the function. A function call may thus invoke external logic and access external information rather than responding based on existing conversational context.

The digital assistant service system 126 detects that the response represents a function call. For example, the model adapter component 206 of the digital assistant service system 126 detects that the response is provided in JSON format and includes a function name and arguments (e.g., as opposed to a free-text response or simple string of data that represents a direct response). In response, the digital assistant service system 126 causes invocation of the relevant function by communicating with a selected one of the backend services 314-318.

The backend services 314-318 may provide capabilities and data sources leveraged by the digital assistant. For example, the backend service 314 may be associated with an enterprise resource planning system, while the backend service 316 is associated with a customer relationship management system, and the backend service 318 is associated with a billing system. Loose coupling (e.g., via APIs) may allow backend services to evolve independently, or to be dynamically changed, while still being available to be leveraged by the digital assistant service system 126.

The digital assistant service system 126 (e.g., the dialog function component 208) may access a mapping of functions to backend services (e.g., respective API endpoints) that allow the digital assistant service system 126 to request the relevant information or action from one of the backend services 314-318 in response to receiving a function call from the LLM 118. As mentioned, the dialog function component 208 may generate suitable output data based on the information retrieved or the action performed via the backend services 314-318.

Figure 4:
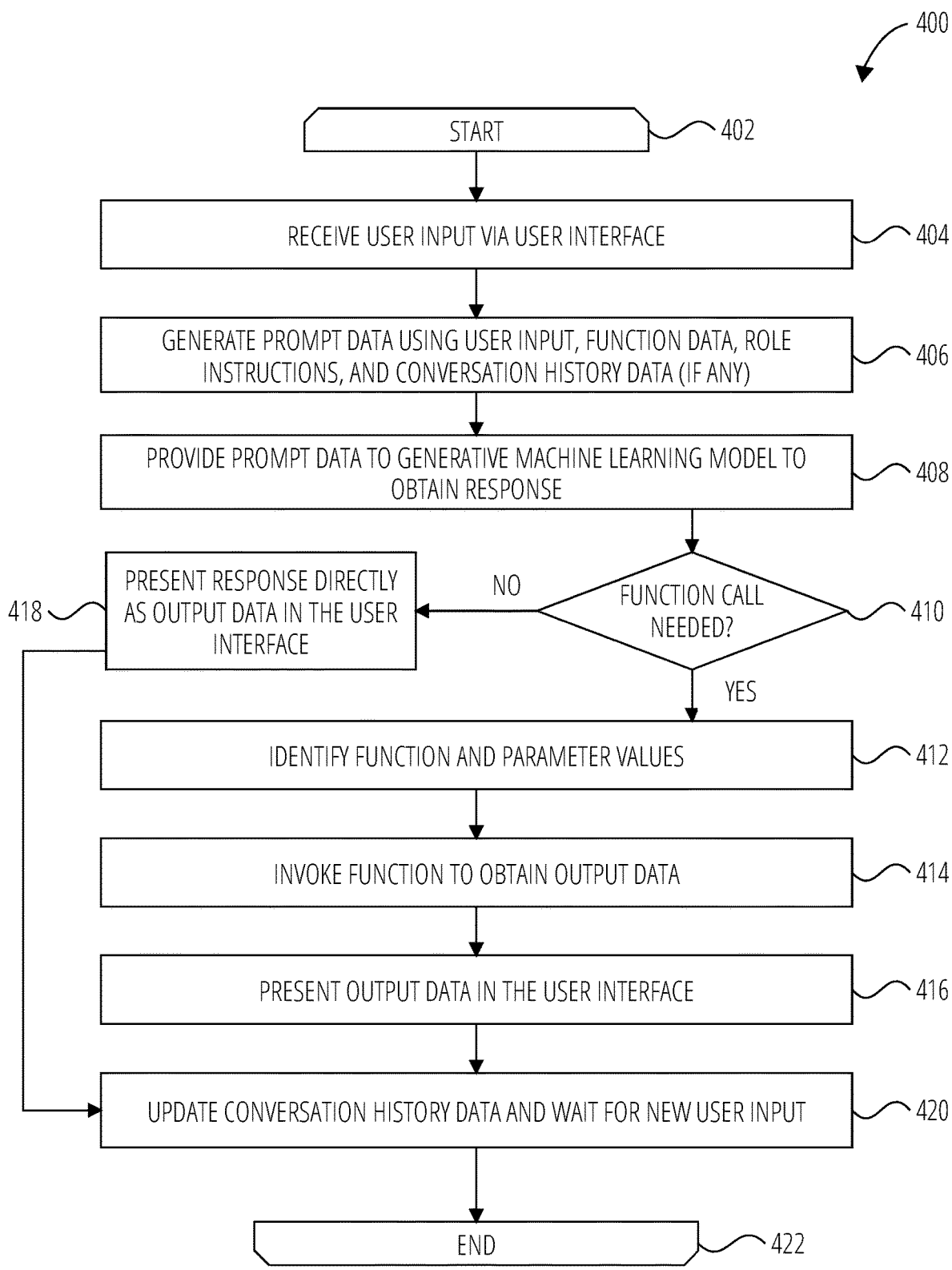
FIG. 4 is a flowchart illustrating operations of a method suitable for generating output data in response to user input received via a user interface associated with a digital assistant, according to some examples.

FIG. 4 is a flowchart illustrating operations of a method 400 suitable for generating output data in response to user input received via a user interface associated with a digital assistant, according to some examples. By way of example and not limitation, aspects of the method 400 may be performed by the components, devices, systems, network, or database shown in FIG. 1 and FIG. 2. Accordingly, elements shown in FIG. 1 and FIG. 2 are referred to in the description below as non-limiting examples.

The method 400 commences at opening loop element 402 and proceeds to operation 404, where the digital assistant service system 126 receives user input via a user interface. For example, the user 108 accesses the digital assistant via the web client 112 and submits a message or query.

At operation 406, the digital assistant service system 126 generates prompt data using the user input, function data, role instructions, and conversation history data (if any previous messages have been submitted by the user). For example, the function data and a role definition may form a "pre-prompt" that enables the LLM 118 to adopt a distinct personality that is focused on helping the user to perform one or more functions. A non-limiting example of such prompt data is provided below. It is noted that, for each function, the prompt data includes a brief description of the characteristics of the function (e.g., what the function does).

```
"role": "system",
"content": "Assistant is a Digital Assistant that can detect
functions to be executed from the current list of functions.
All mandatory parameters need to be obtained from the user in
order to execute a function.
If the assistant wants to invoke a function, the following
format will be used:
{\"name\": \"function_name\", \"arguments\":
\"{\"parameter_name\": \"parameter_value\"}, ... \"}"
}
{
"role": "system",
"content": "The following functions are available:
1. name: get_current_weather, description: Fetch weather for
a city, parameter: City (mandatory) ; metric (optional) ,
2. name: get_status _po, description: get the current status
of a purchase order for a given purchase order
ID, parameter: purchase_order_id (mandatory) ,
3. name: create_sales_order, description: create a sales
order with supplier and item information,
parameter: item_name (mandatory) , supplier_name (mandatory) "
}
```

It is noted that the functions listed above are merely examples. The digital assistant may be enabled to support a greater number of functions, e.g., 10, 50, or 100, depending on the requirements of the implementation. In enterprise-scale implementations, for example, the digital assistant may support an even greater number of functions, e.g., thousands or hundreds of thousands of functions. In addition to the function data and role definition, as mentioned above, the prompt data may also include conversation history data. An example set of conversation history data is shown below.

```
{
"content": "Hi there",
"role": "user"
},
{
"content": "Hello! How can I assist you today?",
"role": "assistant"
},
{
"content": "What's the weather?",
"role": "user"
},
{
"content": "Sure, I can help with that. But I need to know
the location. Could you please provide me with a city?",
"role": "assistant"
},
{
"content": "Walldorf, please",
"role": "user"
},
{
"content": "{\"name\": \"get_current_weather\",
\"arguments\": \"{\"location\": \"Walldorf, Germany\",
\"metric\": \"Celsius\"} \"}",
"role": "assistant"
},
{
"content": "The current weather in Walldorf is 20 degrees C
and sunny",
"role": "assistant"
},
{
```

-continued

```
"content": "and Bangalore, but temperature in Fahrenheit?",
"role": "user"
},
{
"content": "{\"name\": \"get_current_weather\",
\"arguments\": \"{\"location\": \"Bangalore, India\",
\"metric\":\"Fahrenheit\"} \"}",
"role": "assistant"
}
```

In some examples, the prompt data may include examples to guide the LLM 118. For example, the prompt data may include an example user query and an example response in the desired format and style. The prompt data may also include model-specific instructions, such as model parameters. For example, the prompt data may include LLM parameters that relate to settings or configurations of a language model, such as temperature or sampling parameters.

The method 400 proceeds to operation 408, where the prompt data is provided to the LLM 118 to obtain a response. At decision operation 410, the digital assistant service system 126 determines whether a function call is needed. If a function call is needed (e.g., if the response from the LLM 118 contains a function identifier), the digital assistant service system 126 identifies the relevant function and the parameter values (if any) by extracting the data items from the response at operation 412. In some examples, the model adapter component 206 may parse the response to ensure correctness and to check the response type. If the model adapter component 206 validates the function arguments, for example, the digital assistant service system 126 proceeds and the function call is automatically executed.

The digital assistant service system 126 then uses the dialog function component 208 and the destination connector component 210 to invoke the function to obtain output data at operation 414. For example, if the response is the above-indicated function call for Walldorf's weather, the eventual output data may be "The current weather in Walldorf is 20 degrees C. and sunny."

The output data is presented in the user interface at operation 416. If, at decision operation 410, the digital assistant service system 126 determines that no function call is needed (e.g., the response is merely a conversational message that does not intend to invoke a function call), the response from the LLM 118 is presented directly as output data (e.g., a direct response) in the user interface at operation 418. The method 400 includes updating the conversation history data at operation 420 to include the latest output data. The digital assistant service system 126 then waits for new or further user input. The method 400 concludes at closing loop element 422.

Figure 5:
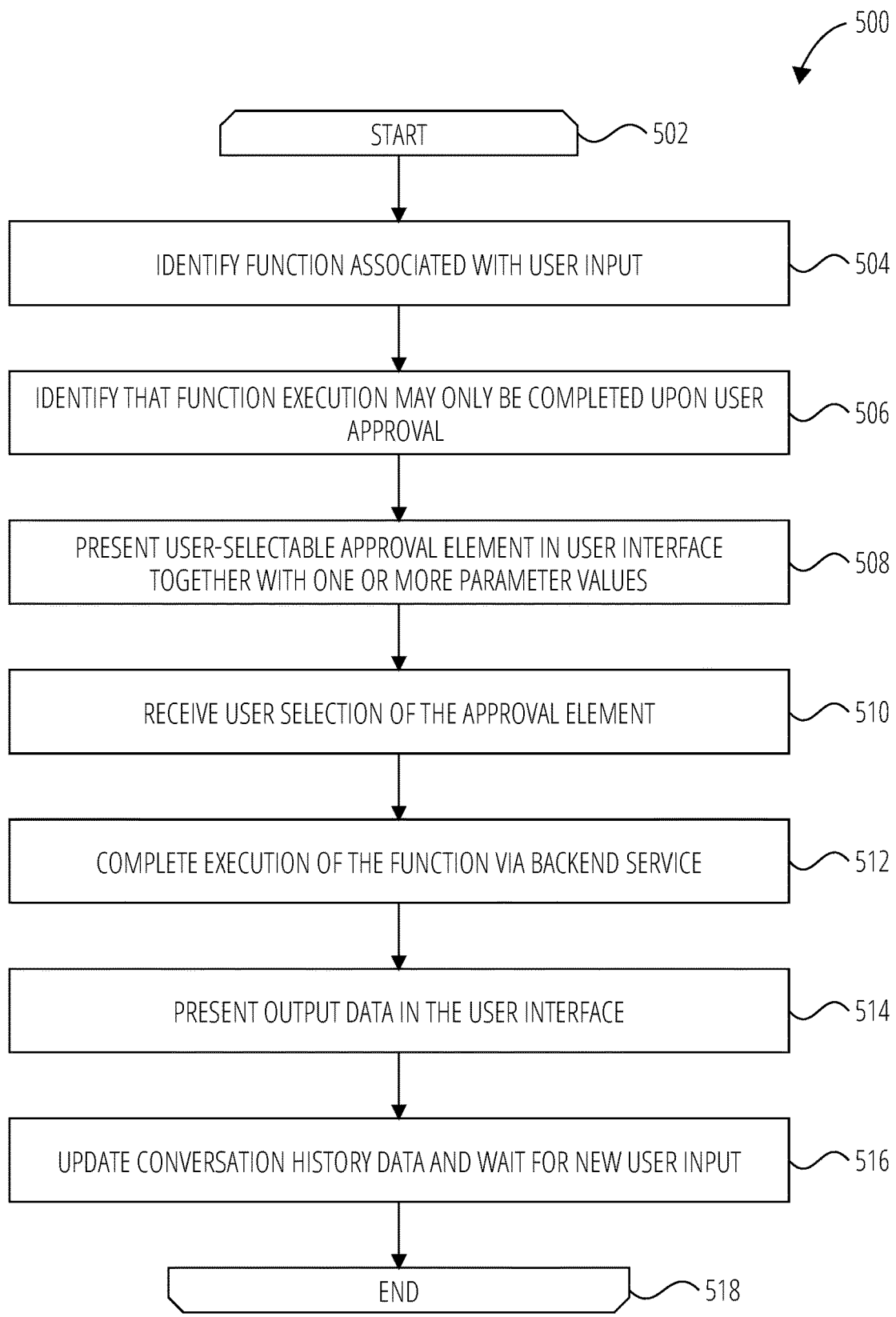
FIG. 5 is a flowchart illustrating operations of a method suitable for generating output data in response to user input received via a user interface associated with a digital assistant, according to some examples.

FIG. 5 is a flowchart illustrating operations of a method 500 suitable for generating output data in response to user input received via a user interface associated with a digital assistant, according to some examples. By way of example and not limitation, aspects of the method 400 may be performed by the components, devices, systems, network, or database shown in FIG. 1 and FIG. 2. Accordingly, elements shown in FIG. 1 and FIG. 2 are referred to in the description below as non-limiting examples.

As mentioned, in some examples, a certain action associated with a function may be restricted. For example, in the case of a business-critical process, such as creating a sales order or modifying a purchase order, it may be desirable to ensure that the user 108 has reviewed and approved the action before finalizing the execution of the function.

The method 500 commences at opening loop element 502 and proceeds to operation 504, where the digital assistant service system 126 identifies a function associated with user input. As described elsewhere, the user 108 may enter a user message via the user interface (e.g., of the web client 112). The LLM 118 processes the user message and returns a response identifying the relevant function. The digital assistant service system 126 may then check the response generated by the LLM 118 and detect that it identifies, for example, the create_sales_order function. The digital assistant service system 126 identifies that the create_sales_order function can only be completed if the user 108 confirms that the parameter values are correct (operation 506).

For example, the digital assistant service system 126 may automatically check a list of restricted actions stored in the database 130 of FIG. 1 in association with corresponding functions. This can be contrasted with, for example, a function such as get_current_weather which is not business-critical, as its execution does not affect business-related data, and thus has no restricted actions.

At operation 508, the digital assistant service system 126 causes presentation of a user-selectable approval element in the user interface associated with the digital assistant, together with one or more parameter values. For example, the user interface may be updated with the details of the proposed sales order (e.g., item name and supplier name as included in the user message processed by the LLM 118), together with an "OK" button (as an example of an approval element), as well as a "CANCEL" button and an "EDIT" button.

The method 500 proceeds to operation 510, where the digital assistant service system 126 receives user selection of the approval element at operation 510. In response to detecting approval of the restricted action, the digital assistant service system 126 then completes execution of the function at operation 512. For example, the dialog function component 208 and the destination connector component 210 are used to communicate with the relevant backend service to create the sales order.

At operation 514, output data is presented in the user interface. For example, the dialog function component 208 may obtain a sales order number returned by the backend service, and generate a message that indicates: "Thank you. Your sales order has been created. The sales order number is [NUMBER]." The method 500 includes updating the conversation history data at operation 516 to include the latest output data (e.g., the latest user message, the function call, as well as the corresponding output data). The digital assistant service system 126 then waits for new or further user input. The method 500 concludes at closing loop element 518.

Figure 6:
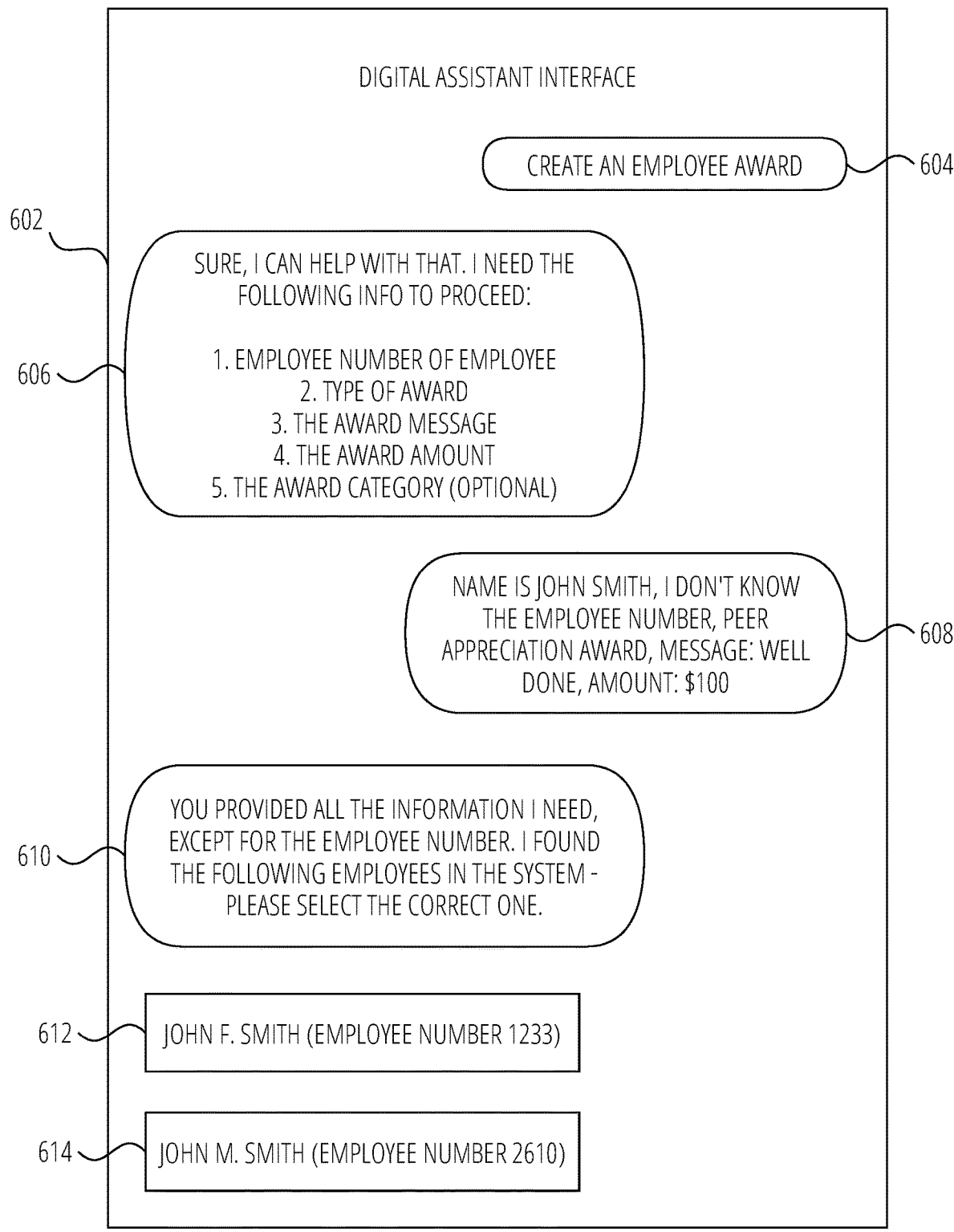
FIG. 6 is a user interface diagram illustrating a digital assistant interface during a first stage of a conversation, according to some examples.

FIG. 6 is a user interface diagram illustrating a digital assistant interface 602, according to some examples. The digital assistant interface 602 can, for example, be displayed on a display of the user device 106 of FIG. 1 (e.g., via the web client 112). However, the digital assistant interface 602 may be presented in various other ways (e.g., within a dedicated mobile application) and on various types of devices.

The digital assistant interface 602 is associated with a digital assistant (e.g., provided by the digital assistant service system 126 of FIG. 1) that leverages a generative machine learning model (e.g., the LLM 118 of FIG. 1), as described in various examples herein. The digital assistant uses the generative machine learning model to replace conventional natural language understanding components and dialog management utilized in digital assistants, thereby providing an efficient and powerful tool.

FIG. 6 illustrates a first stage of a conversation between a user (e.g., the user 108 of FIG. 1) and the digital assistant. The user submits a first message 604 that indicates that the user wishes to create an employee award. The first message 604 is processed by the generative machine learning model. The generative machine learning model identifies that the first message 604 relates to a supported function (e.g., a create employee award function), but that the digital assistant service system 126 does not have all the required parameter values needed to generate the function call.

Accordingly, the generative machine learning model generates a direct response in the example form of a first response 606. The first response 606 indicates the information required from the user in order to assist with the request (e.g., a natural language description of the defined parameter values within the function data processed by the generative machine learning model). The user submits a second message 608 which provides only a subset of the parameter values needed. Specifically, the second message 608 does not identify the employee number of the employee who should receive the award.

The generative machine learning model identifies that the subset of the parameter values has been provided, but that the employee number is missing. As mentioned above, in some cases, the digital assistant service system 126 may use one function to obtain one or more parameter values for another function, and this is the case in FIG. 6. The generative machine learning model uses the name provided ("John Smith") and generates a different function call to obtain associated employee numbers (e.g., a query_employee_number function that takes a name and surname as arguments). The function call returns two results.

The generative machine learning model then generates a direct response in the example form of a second response 610, indicating that two possible employee numbers were retrieved and that the user should select the correct one. The output data from the function call that was invoked to obtain the employee numbers is presented to the user as a user-selectable element 612 and a user-selectable element 614, representing the two results, respectively.

In this case, the user selects the user-selectable element 612 corresponding to "John F. Smith." The generative machine learning model may then use the selection of the user to perform dynamic slot-filling. In this way, the digital assistant service system 126 is able to support slot-filling in the context of its function calling capabilities without requiring explicit slot-filling modeling during creation of the digital assistant. In other words, the generative machine learning model automatically works to extract the parameter values needed to trigger the relevant function.

Figure 7:
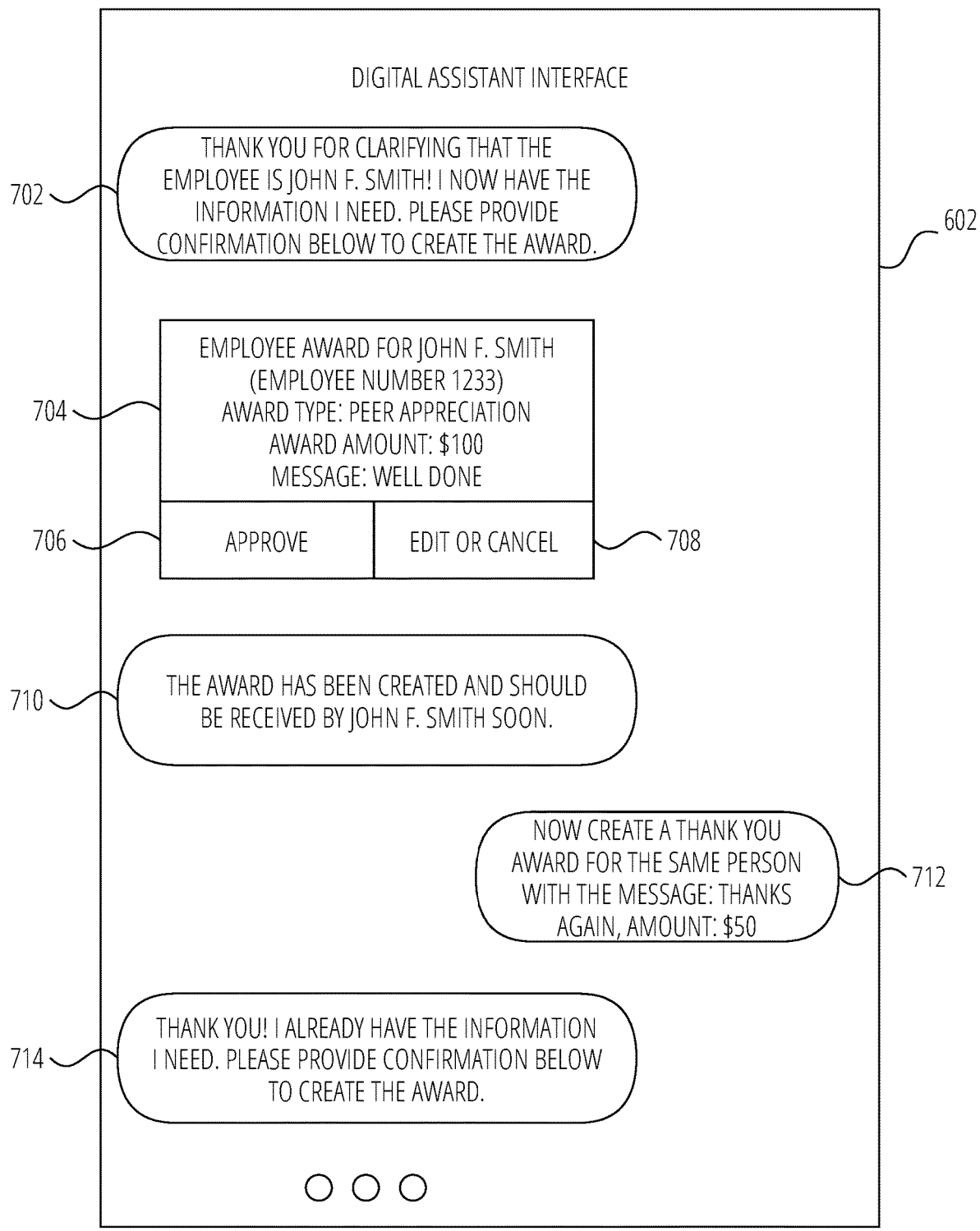
FIG. 7 is a user interface diagram illustrating the digital assistant interface of FIG. 6 during a second stage of the conversation, according to some examples.

FIG. 7 is a user interface diagram illustrating the digital assistant interface 602 of FIG. 6 during a second stage of the conversation, according to some examples. The digital assistant service system 126 identifies that completion of the employee award function is a restricted action, as described elsewhere.

As a result, the user is presented with a third response 702 indicating (a) that all required information has been provided and (b) that confirmation is needed to create the award. The digital assistant service system 126 then causes an information box 704 to be presented in the digital assistant interface 602. The information box 704 shows the proposed details of the employee award (including the parameter values), together with a user-selectable element 706 and a user-selectable element 708. The user-selectable element 706 allows the user to approve the creation of the employee award, while the user-selectable element 708 allows the user to edit the details thereof or cancel the action.

The user selects the user-selectable element 706 to approve the restricted action. The digital assistant service system 126 then invokes the function and the employee award is created (e.g., by submitting an API call to a human resources system connected to the digital assistant service system 126). The digital assistant service system 126 receives output indicating that the award was successfully created and presents confirmation thereof to the user via the fourth response 710.

The user then submits a third message 712 indicating that the user wishes to have another employee award created, but with some (but not all) different parameter values. The generative machine learning model is able to use the conversation history data of the conversation to resolve co-references, without any explicit modeling thereof. Accordingly, the generative machine learning model identifies that the digital assistant service system 126 already has all the parameter values needed to create the additional employee award even though the third message 712 includes only a subset of the parameter values. For example, the generative machine learning model automatically identifies that the "same person" is "John F. Smith." The conversation proceeds to the fifth response 714 as shown in FIG. 7, which may be followed up by an information box (not shown) similar to the information box 704, and the conversation may then continue based on further user input received.

In addition to technical benefits mentioned elsewhere, examples described herein may provide various technical benefits, such as one or more of the following:

The use of dialog functions may streamline the integration of various scenarios or capabilities. Dialog functions may be used to invoke actions or retrieve information, with a generative machine learning model providing central context handling across all such scenarios or capabilities.

A modular architecture is provided. This may allow for easier integration of new functions into a digital assistant and reduce downtime.

The process of model training or digital assistant development may be made easier or faster by reducing or obviating the need for certain data, such as intents and entities. In some examples, the need to manually label training data is reduced or eliminated. Where a pre-trained LLM is selected, for example, the need for some or all training data that would otherwise be required can be obviated.

A digital assistant as described herein may provide natural language understanding capabilities, such as co-reference resolution, for more intelligent conversations.

Conversational flows are generated automatically and no predefined conversational flows are needed.

In some examples, business-critical responses or actions are controlled to provide reliable and predictable outcomes, while still allowing users to leverage the power of generative AI. For example, critical responses or restricted actions can be explicitly defined to ensure that they are deterministically handled. This may mitigate the risk of model hallucination causing problems with respect to business-critical actions, such as creating incorrect business artifacts or incorrectly modifying data in a database.

The digital assistant may be enabled to handle multiple languages without having been explicitly modeled or instructed to do so. For example, the function data can be provided to the digital assistant in English, but the digital assistant may be able to interpret and generate a correct function call even if the user provides inputs in German. This may further reduce input data, processing, or memory requirements.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: providing prompt data to a generative machine learning model to obtain a response, the prompt data comprising user input and function data, the user input received via a user interface associated with a digital assistant, and the function data identifying a plurality of functions; detecting that the response includes, a function identifier associated with a function from among the plurality of functions; in response to detecting that the response includes the function identifier, invoking the function to obtain output data; and causing presentation of the output data in the user interface associated with the digital assistant.

In Example 2, the subject matter of Example 1 includes, wherein the response is a second response from the generative machine learning model and the output data is second output data, the operations further comprising: obtaining, from the generative machine learning model, a first response associated with at least a subset of the prompt data; detecting that the first response does not include the function identifier; and in response to detecting that the first response does not include the function identifier, causing presentation of first output data in the user interface associated with the digital assistant, the first output data comprising the first response.

In Example 3, the subject matter of Example 2 includes, wherein the first response is a direct response provided by the generative machine learning model in an unstructured format, and the second response is a function call provided by the generative machine learning model in a structured format.

In Example 4, the subject matter of Example 3 includes, wherein the direct response comprises at least one of: a request for additional user input related to the function, or a non-function-related response.

In Example 5, the subject matter of any of Examples 1-4 includes, wherein the prompt data comprises a role definition for the digital assistant and defines a structured format in which to provide responses that are intended to trigger functions from among the plurality of functions.

In Example 6, the subject matter of any of Examples 1-5 includes, wherein the function data comprises, for each of the plurality of functions, a natural language description of one or more characteristics of the function.

In Example 7, the subject matter of any of Examples 1-6 includes, wherein one or more of the plurality of functions each has one or more parameters that are identified in the prompt data, and wherein the function identified by the function identifier is invoked using a parameter value for each of the one or more parameters of the function.

In Example 8, the subject matter of Example 7 includes, wherein the response comprises a function call associated with the function, the response including the parameter value for each of the one or more parameters of the function, and the invoking of the function comprises automatically executing the function call to obtain the output data.

In Example 9, the subject matter of Example 8 includes, wherein the function call is an Application Programming Interface (API) call, the execution of the function call comprising: selecting an API endpoint associated with the function from among a plurality of API endpoints associated with the function data; generating the API call to include the parameter value for each of the one or more parameters of the function; transmitting the API call to the API endpoint; and receiving the output data from the API endpoint.

In Example 10, the subject matter of any of Examples 1-9 includes, the operations further comprising: parsing the response to determine whether the response is a direct response or a function call, wherein the response is identified as being a function call based on the detection of the function identifier.

In Example 11, the subject matter of any of Examples 7-10 includes, the operations further comprising: identifying a restricted action associated with the function; in response to identifying the restricted action, causing presentation of a user-selectable approval element in the user interface together with the parameter value for at least one of the one or more parameters; receiving a user selection of the user-selectable approval element; and in response to receiving the user selection of the user-selectable approval element, performing the restricted action associated with the function.

In Example 12, the subject matter of Example 11 includes, wherein the restricted action comprises completing execution of the function.

In Example 13, the subject matter of any of Examples 1-12 includes, the operations further comprising: receiving the user input via the user interface; and generating the prompt data by adding at least the user input to the function data.

In Example 14, the subject matter of any of Examples 1-13 includes, wherein the generative machine learning model comprises a large language model (LLM) and the user input comprises a user message in natural language format.

Example 15 is a method comprising: providing, by one or more computing devices, prompt data to a generative machine learning model to obtain a response, the prompt data comprising user input and function data, the user input received via a user interface associated with a digital assistant, and the function data identifying a plurality of functions; detecting, by the one or more computing devices, that the response includes, a function identifier associated with a function from among the plurality of functions; in response to detecting that the response includes the function identifier, invoking, by the one or more computing devices, the function to obtain output data; and causing, by the one or more computing devices, presentation of the output data in the user interface associated with the digital assistant.

In Example 16, the subject matter of Example 15 includes, wherein the response is a second response from the generative machine learning model and the output data is second output data, the method further comprising: obtaining, by the one or more computing devices and from the generative machine learning model, a first response associated with at least a subset of the prompt data; detecting, by the one or more computing devices, that the first response does not include the function identifier; and in response to detecting that the first response does not include the function identifier, causing, by the one or more computing devices, presentation of first output data in the user interface associated with the digital assistant, the first output data comprising the first response.

In Example 17, the subject matter of Example 16 includes, wherein the first response is a direct response provided by the generative machine learning model in an unstructured format, and the second response is a function call provided by the generative machine learning model in a structured format.

Example 18 is a non-transitory computer-readable medium that stores instructions that, when executed by one or more processors, cause the one or more processors to perform operations comprising: providing prompt data to a generative machine learning model to obtain a response, the prompt data comprising user input and function data, the user input received via a user interface associated with a digital assistant, and the function data identifying a plurality of functions; detecting that the response includes, a function identifier associated with a function from among the plurality of functions; in response to detecting that the response includes the function identifier, invoking the function to obtain output data; and causing presentation of the output data in the user interface associated with the digital assistant.

In Example 19, the subject matter of Example 18 includes, wherein the response is a second response from the generative machine learning model and the output data is second output data, the operations further comprising: obtaining, from the generative machine learning model, a first response associated with at least a subset of the prompt data; detecting that the first response does not include the function identifier; and in response to detecting that the first response does not include the function identifier, causing presentation of first output data in the user interface associated with the digital assistant, the first output data comprising the first response.

In Example 20, the subject matter of Example 19 includes, wherein the first response is a direct response provided by the generative machine learning model in an unstructured format, and the second response is a function call provided by the generative machine learning model in a structured format.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
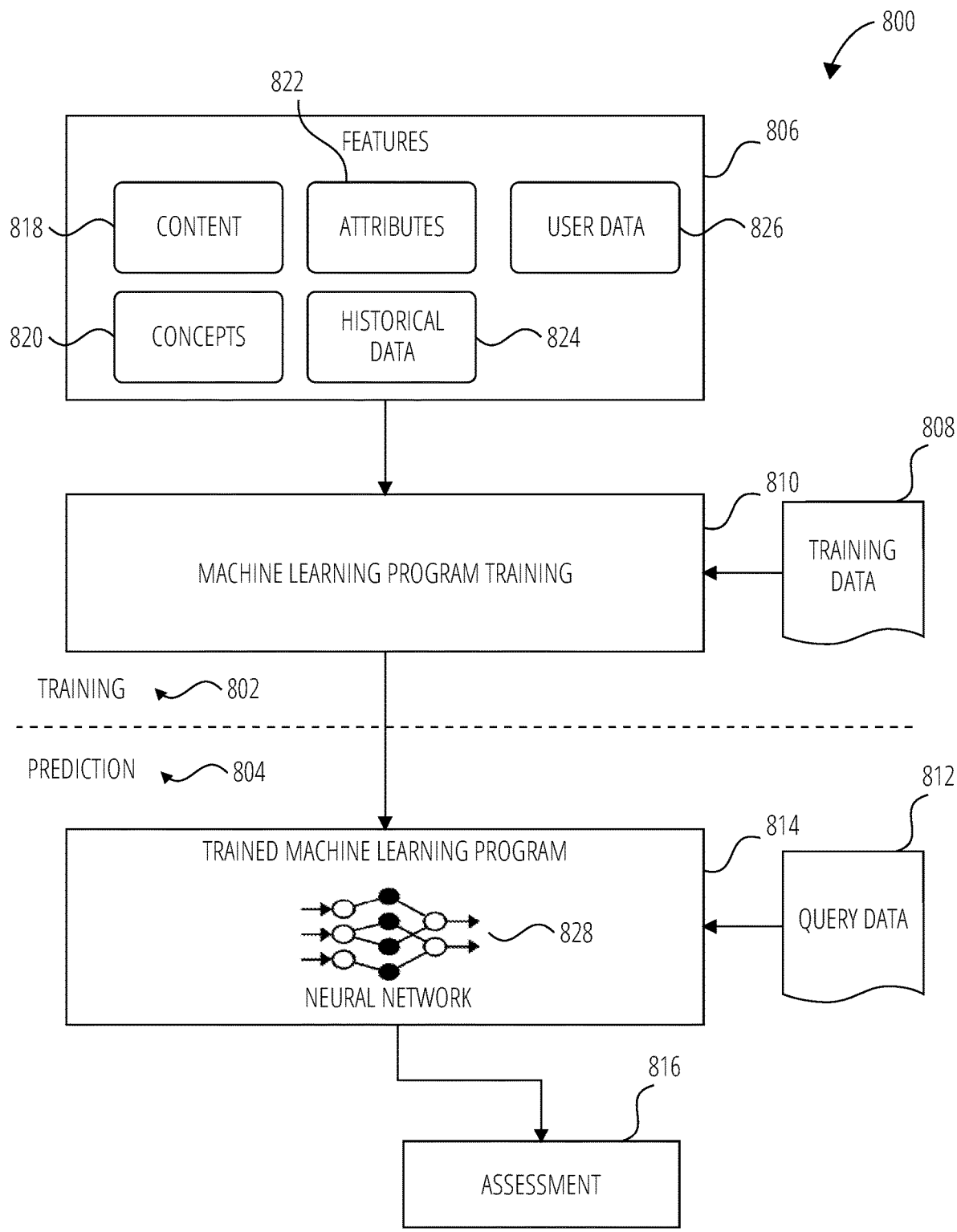
FIG. 8 diagrammatically illustrates training and use of a machine learning program, according to some examples.

FIG. 8 is a block diagram showing a machine learning program 800, according to some examples. Machine learning programs, also referred to as machine learning algorithms or tools, may be used as part of the systems described herein to perform one or more operations, e.g., to identify relations between reported issues and context data, to identify contextual dependencies, to extract or infer additional issue metadata using initial issue metadata, to generate priority ratings, to generate estimated impacts, or combinations thereof.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 808 in order to make data-driven predictions or decisions expressed as outputs or assessments (e.g., assessment 816). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 800 supports two types of phases, namely training phases 802 and prediction phases 804. In training phases 802, supervised learning, unsupervised or reinforcement learning may be used. For example, the machine learning program 800 (1) receives features 806 (e.g., as structured or labeled data in supervised learning) and/or (2) identifies features 806 (e.g., unstructured or unlabeled data for unsupervised learning) in training data 808. In prediction phases 804, the machine learning program 800 uses the features 806 for analyzing query data 812 to generate outcomes or predictions, as examples of an assessment 816.

In the training phase 802, feature engineering is used to identify features 806 and may include identifying informative, discriminating, and independent features for the effective operation of the machine learning program 800 in pattern recognition, classification, and regression. In some examples, the training data 808 includes labeled data, which is known data for pre-identified features 806 and one or more outcomes. Each of the features 806 may be a variable or attribute, such as individual measurable property of a process, article, system, or phenomenon represented by a data set (e.g., the training data 808). Features 806 may also be of different types, such as numeric features, strings, and graphs, and may include one or more of content 818, concepts 820, attributes 822, historical data 824 and/or user data 826, merely for example.

The concept of a feature in this context is related to that of an explanatory variable used in statistical techniques such as linear regression. Choosing informative, discriminating, and independent features is important for the effective operation of the machine learning program 800 in pattern recognition, classification, and regression. Features may be of different types, such as numeric features, strings, and graphs.

In training phases 802, the machine learning program 800 uses the training data 808 to find correlations among the features 806 that affect a predicted outcome or assessment 816.

With the training data 808 and the identified features 806, the machine learning program 800 is trained during the training phase 802 at machine learning program training 810. The machine learning program 800 appraises values of the features 806 as they correlate to the training data 808. The result of the training is the trained machine learning program 814 (e.g., a trained or learned model).

Further, the training phases 802 may involve machine learning, in which the training data 808 is structured (e.g., labeled during preprocessing operations), and the trained machine learning program 814 implements a relatively simple neural network 828 capable of performing, for example, classification and clustering operations. In other examples, the training phase 802 may involve deep learning, in which the training data 808 is unstructured, and the trained machine learning program 814 implements a deep neural network 828 that is able to perform both feature extraction and classification/clustering operations.

A neural network 828 generated during the training phase 802, and implemented within the trained machine learning program 814, may include a hierarchical (e.g., layered) organization of neurons. For example, neurons (or nodes) may be arranged hierarchically into a number of layers, including an input layer, an output layer, and multiple hidden layers. Each of the layers within the neural network 828 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 828 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example.

During prediction phases 804, the trained machine learning program 814 is used to perform an assessment. Query data 812 is provided as an input to the trained machine learning program 814, and the trained machine learning program 814 generates the assessment 816 as output, responsive to receipt of the query data 812.

In some examples, the trained machine learning program 814 may be a generative artificial intelligence (AI) model. Generative AI is a term that may refer to any type of AI that can create new content. For example, generative AI can produce text, images, video, audio, code, or synthetic data. In some examples, the generated content may be similar to the original data, but not identical.

Some of the techniques that may be used in generative AI are:
- CNNs: CNNs may be used for image recognition and computer vision tasks. CNNs may, for example, be designed to extract features from images by using filters or kernels that scan the input image and highlight important patterns.
- RNNs: RNNs may be used for processing sequential data, such as speech, text, and time series data, for example. RNNs employ feedback loops that allow them to capture temporal dependencies and remember past inputs.
- GANs: GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.
- Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.
- Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code. For example, the LLM 118 of FIG. 1 may be a transformer model, or may be based on a transformer model. Non-limiting examples of LLMs that use transformer models include GPT-4 (Generative Pre-trained Transformer 4) developed by OpenAI™, BERT (Bidirectional Encoder Representations from Transformers) developed by Google™, LLaMA (Large Language Model Meta AI) developed by Meta™, and PaLM2 (Pathways Language Model 2) developed by Google™.

In generative AI examples, the assessment 816 generated as a response or output by the trained machine learning program 814 may include predictions, translations, summaries, answers to questions, suggestions, media content, or combinations thereof. For example, the LLM 118 of FIG. 1 may generate natural language responses in a conversational style, or the LLM 118 may generate function calls that align with a specific schema.

In some examples, a machine learning model may be fine-tuned. The term "fine-tuning," as used herein, generally refers to a process of adapting a pre-trained machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model.

Figure 9:
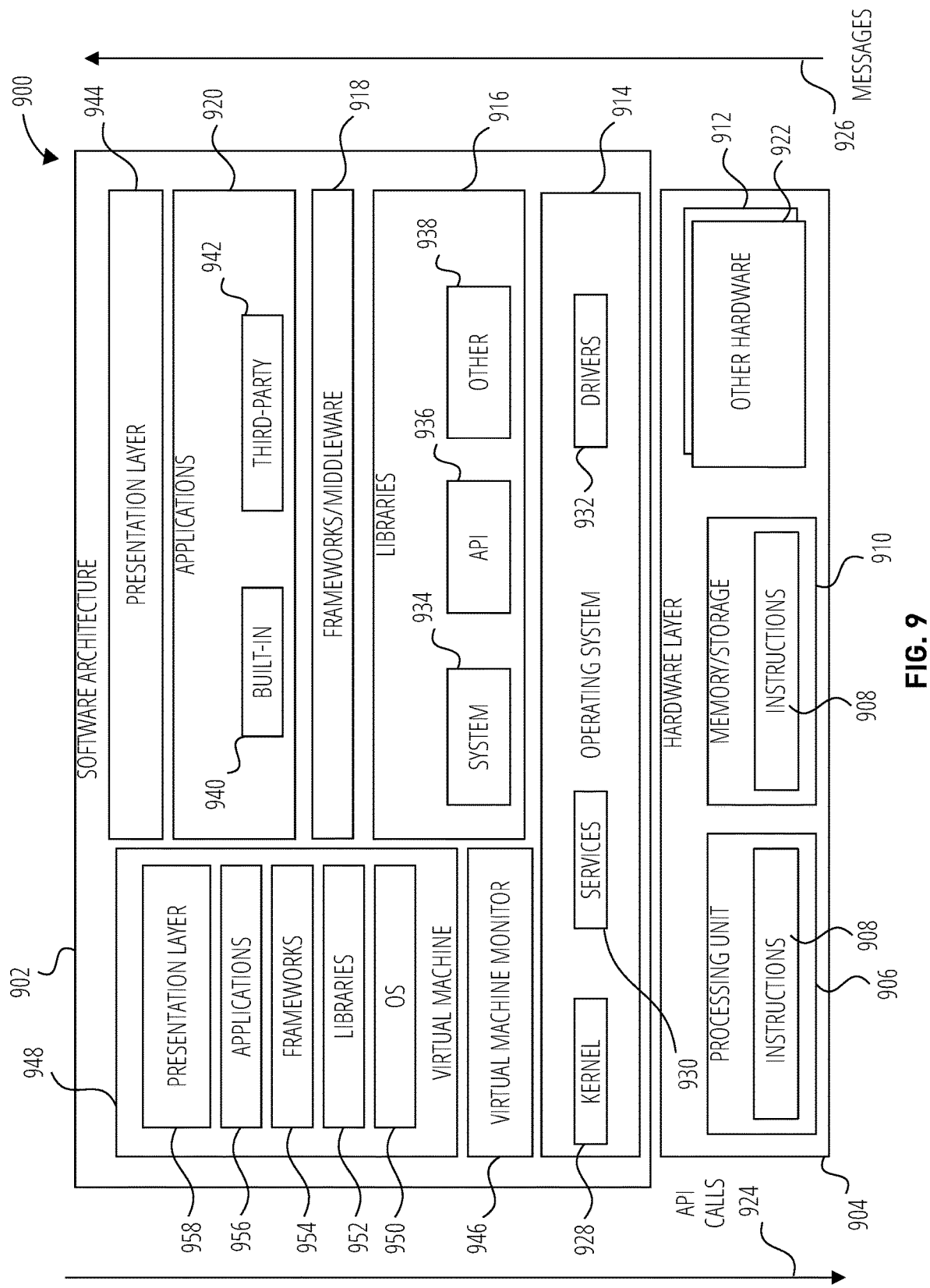
FIG. 9 is a block diagram showing a software architecture for a computing device, according to some examples.

FIG. 9 is a block diagram 900 showing a software architecture 902 for a computing device, according to some examples. The software architecture 902 may be used in conjunction with various hardware architectures, for example, as described herein. FIG. 9 is merely a non-limiting illustration of a software architecture, and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 and other hardware 922 which represent any other hardware of the hardware layer 904, such as the other hardware illustrated as part of the software architecture 902.

In the architecture of FIG. 9, the software architecture 902 may be conceptualized as a stack of layers where each layer provides particular functionality. For example, the software architecture 902 may include layers such as an operating system 914, libraries 916, frameworks/middleware layer 918, applications 920, and presentation layer 944. Operationally, the applications 920 or other components within the layers may invoke API calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the software architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 or other components or layers. The libraries 916 typically provide functionality that allows other software modules to perform tasks in an easier fashion than to interface directly with the underlying operating system 914 functionality (e.g., kernel 928, services 930 or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware layer 918 may provide a higher-level common infrastructure that may be utilized by the applications 920 or other software components/modules. For example, the frameworks/middleware layer 918 may provide various graphic user interface (GUI) functions, high-level resource management, high-level location services, and so forth. The frameworks/middleware layer 918 may provide a broad spectrum of other APIs that may be utilized by the applications 920 or other software components/modules, some of which may be specific to a particular operating system or platform.

The applications 920 include built-in applications 940 or third-party applications 942. Examples of representative built-in applications 940 may include, but are not limited to, a contacts application, a browser application, a book reader application, a location application, a media application, a messaging application, or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 or drivers 932), libraries (e.g., system libraries 934, API libraries 936, and other libraries 938), and frameworks/middleware layer 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (e.g., operating system 914). A software architecture executes within the virtual machine 948 such as an operating system 950, libraries 952, frameworks/middleware 954, applications 956 or presentation layer 958. These layers of software architecture executing within the virtual machine 948 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations. It will be appreciated that the decision to implement a hardware-implemented module/component mechanically, in dedicated and permanently configured circuitry, or in temporarily configured circuitry (e.g., configured by software) may be driven by cost and time considerations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output. Hardware-implemented modules/components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 10:
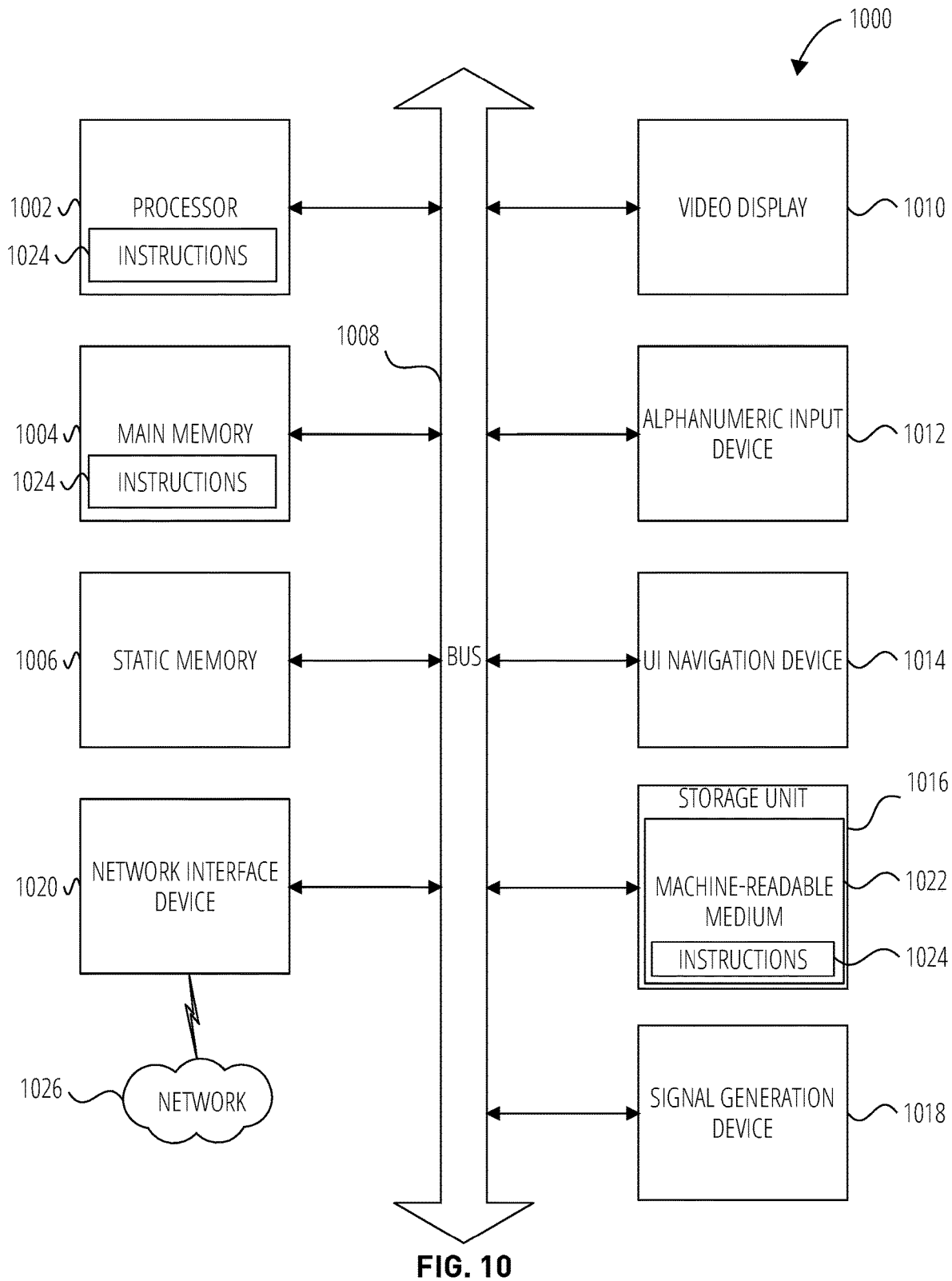
FIG. 10 is a block diagram of a machine in the form of a computer system, according to some examples, within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a GPU, or both), a primary or main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a UI navigation (or cursor control) device 1014 (e.g., a mouse), a storage unit 1016, a signal generation device 1018 (e.g., a speaker), and a network interface device 1020.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 or within the processor 1002 during execution thereof by the computer system 1000, with the main memory 1004 and the processor 1002 also each constituting a machine-readable medium 1022.

While the machine-readable medium 1022 is shown in accordance with some examples to be a single medium, the term "machine-readable medium" may include a single medium or multiple media (e.g., a centralized or distributed database, or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of a machine-readable medium 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data,"

"content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
   at least one memory that stores instructions; and
   one or more processors configured by the instructions to perform operations comprising:
      obtaining a first response from a generative machine learning model;
      detecting that the first response does not include a function identifier;
      in response to detecting that the first response does not include the function identifier, causing presentation of first output data in a user interface associated with a digital assistant, the first output data comprising the first response;
      providing prompt data to the generative machine learning model to obtain a second response, the prompt data comprising user input and function data, the user input received via the user interface associated with the digital assistant, the function data identifying a plurality of functions, and the first response being associated with at least a subset of the prompt data;
      detecting that the second response includes the function identifier, the function identifier being associated with a function from among the plurality of functions;
      in response to detecting that the second response includes the function identifier, invoking the function to obtain second output data; and
      causing presentation of the second output data in the user interface associated with the digital assistant.

2. The system of claim 1, wherein the first response is a direct response provided by the generative machine learning model in an unstructured format, and the second response is a function call provided by the generative machine learning model in a structured format.

3. The system of claim 2, wherein the direct response comprises at least one of: a request for additional user input related to the function, or a non-function-related response.

4. The system of claim 1, wherein the prompt data comprises a role definition for the digital assistant and defines a structured format in which to provide responses that are intended to trigger functions from among the plurality of functions.

5. The system of claim 1, wherein the function data comprises, for each of the plurality of functions, a natural language description of one or more characteristics of the function.

6. The system of claim 1, wherein one or more of the plurality of functions each has one or more parameters that are identified in the prompt data, and wherein the function identified by the function identifier is invoked using a parameter value for each of the one or more parameters of the function.

7. The system of claim 6, wherein the second response comprises a function call associated with the function, the second response including the parameter value for each of the one or more parameters of the function, and the invoking of the function comprises automatically executing the function call to obtain the output data.

8. The system of claim 7, wherein the function call is an Application Programming Interface (API) call, and the automatically executing the function call comprises:
   selecting an API endpoint associated with the function from among a plurality of API endpoints associated with the function data;
   generating the API call to include the parameter value for each of the one or more parameters of the function;
   transmitting the API call to the API endpoint; and
   receiving the output data from the API endpoint.

9. The system of claim 1, the operations further comprising:
   parsing the second response to determine whether the second response is a direct response or a function call, wherein the second response is identified as being a function call based on the detection of the function identifier.

10. The system of claim 6, the operations further comprising:
    identifying a restricted action associated with the function;

in response to identifying the restricted action, causing presentation of a user-selectable approval element in the user interface together with the parameter value for at least one of the one or more parameters;

receiving a user selection of the user-selectable approval element; and in response to receiving the user selection of the user-selectable approval element, performing the restricted action associated with the function.

11. The system of claim 10, wherein the restricted action comprises completing execution of the function.

12. The system of claim 1, wherein the user input comprises a user message provided by a user of the digital assistant, at least one of the first output data or the second output data is generated to respond to the user message, and the prompt data further comprises conversation history data that includes one or more earlier user messages provided by the user and earlier output data generated to respond to the one or more earlier user messages.

13. The system of claim 1, wherein the generative machine learning model comprises a large language model (LLM) and the user input comprises a user message in natural language format.

14. A method comprising:

obtaining a first response from a generative machine learning model;

detecting, by one or more computing devices, that the first response does not include a function identifier;

in response to detecting that the first response does not include the function identifier, causing presentation of first output data in a user interface associated with a digital assistant, the first output data comprising the first response;

providing, by the one or more computing devices, prompt data to the generative machine learning model to obtain a second response, the prompt data comprising user input and function data, the user input received via the user interface associated with the digital assistant, the function data identifying a plurality of functions, and the first response being associated with at least a subset of the prompt data;

detecting, by the one or more computing devices, that the second response includes the function identifier, the function identifier being associated with a function from among the plurality of functions;

in response to detecting that the second response includes the function identifier, invoking, by the one or more computing devices, the function to obtain second output data; and causing, by the one or more computing devices, presentation of the second output data in the user interface associated with the digital assistant.

15. The method of claim 5, wherein the first response is a direct response provided by the generative machine learning model in an unstructured format, and the second response is a function call provided by the generative machine learning model in a structured format.

16. The method of claim 14, wherein one or more of the plurality of functions each has one or more parameters that are identified in the prompt data, and wherein the function identified by the function identifier is invoked using a parameter value for each of the one or more parameters of the function.

17. The method of claim 16, wherein the second response comprises a function call associated with the function, the second response including the parameter value for each of the one or more parameters of the function, and the invoking of the function comprises automatically executing the function call to obtain the output data.

18. The method of claim 17, wherein the function call is an Application Programming Interface (API) call, and the automatically executing the function call comprises:

selecting an API endpoint associated with the function from among a plurality of API endpoints associated with the function data;

generating the API call to include the parameter value for each of the one or more parameters of the function;

transmitting the API call to the API endpoint; and receiving the output data from the API endpoint.

19. A non-transitory computer-readable medium that stores instructions that, when executed by one or more processors, cause the one or more processors to perform operations comprising:

obtaining a first response from a generative machine learning model;

detecting that the first response does not include a function identifier;

in response to detecting that the first response does not include the function identifier, causing presentation of first output data in a user interface associated with a digital assistant, the first output data comprising the first response;

providing prompt data to the generative machine learning model to obtain a second response, the prompt data comprising user input and function data, the user input received via the user interface associated with the digital assistant, the function data identifying a plurality of functions, and the first response being associated with at least a subset of the prompt data;

detecting that the second response includes the function identifier, the function identifier being associated with a function from among the plurality of functions;

in response to detecting that the second response includes the function identifier, invoking the function to obtain second output data; and causing presentation of the second output data in the user interface associated with the digital assistant.

20. The non-transitory computer-readable medium of claim 19, wherein the first response is a direct response provided by the generative machine learning model in an unstructured format, and the second response is a function call provided by the generative machine learning model in a structured format.

* * * * *